(12) United States Patent
Kim et al.

(10) Patent No.: US 12,425,365 B2
(45) Date of Patent: Sep. 23, 2025

(54) APPARATUS AND METHOD FOR MANAGING TERMINAL IN NETWORK

(71) Applicant: VIASCOPE INC., Seoul (KR)

(72) Inventors: Janghun Kim, Yongin-si (KR); Jun Seok Kang, Seoul (KR)

(73) Assignee: VIASCOPE INC., Seoul (KR)

( * ) Notice: Subject to any disclaimer, the term of this patent is extended or adjusted under 35 U.S.C. 154(b) by 0 days.

(21) Appl. No.: 18/689,625

(22) PCT Filed: May 4, 2022

(86) PCT No.: PCT/KR2022/006448
§ 371 (c)(1),
(2) Date: Mar. 6, 2024

(87) PCT Pub. No.: WO2023/038224
PCT Pub. Date: Mar. 16, 2023

(65) Prior Publication Data
US 2025/0126090 A1    Apr. 17, 2025

(30) Foreign Application Priority Data

Sep. 9, 2021    (KR) .................. 10-2021-0120559
Jan. 19, 2022   (KR) .................. 10-2022-0008109

(51) Int. Cl.
*H04L 61/103*    (2022.01)
*H04L 9/40*      (2022.01)

(52) U.S. Cl.
CPC ........ *H04L 61/103* (2013.01); *H04L 63/1416* (2013.01)

(58) Field of Classification Search
None
See application file for complete search history.

(56) References Cited

U.S. PATENT DOCUMENTS 6,925,079 B2 *   8/2005   Matsukawa ......... H04L 61/5076
                                                      370/389
7,061,942 B2 *   6/2006   Noronha, Jr. ..... H04N 21/23608
                                                      370/219
(Continued)

FOREIGN PATENT DOCUMENTS

CN    102938715 A    2/2013
JP    2007-195057 A  8/2007
(Continued)

*Primary Examiner* — Melvin H Pollack
(74) *Attorney, Agent, or Firm* — ALSTON & BIRD LLP

(57) ABSTRACT

A method for managing a terminal, according to one embodiment, may comprise the steps of: collecting, from packets received from a plurality of terminals connected to a network, address data of the plurality of terminals and state information indicating a network connection state of each of the plurality of terminals; obtaining, from a received ARP probe packet, a first IP address and a first MAC address of a first terminal that has transmitted the ARP probe packet; and, when address data including the same IP address and MAC address as the first IP address and the first MAC address is retrieved from among pre-stored address data, determining whether the first terminal is a stolen terminal that has copied address data of another terminal, according to the state information of a terminal having the same address data as the first IP address and the first MAC address from among the plurality of terminals.

20 Claims, 3 Drawing Sheets

(56) References Cited

U.S. PATENT DOCUMENTS

| | | | | |
|---|---|---|---|---|
| 7,382,778 B2* | 6/2008 | Chari | | H04L 61/2596 |
| | | | | 370/406 |
| 7,471,684 B2* | 12/2008 | Finley, Jr. | | H04L 63/1466 |
| | | | | 370/392 |
| 7,492,772 B2* | 2/2009 | Nam | | H04L 61/10 |
| | | | | 370/395.54 |
| 8,024,435 B2* | 9/2011 | Guo | | H04L 61/5014 |
| | | | | 370/254 |
| 8,539,055 B2* | 9/2013 | Lv | | H04L 41/0803 |
| | | | | 709/225 |
| 9,398,045 B2* | 7/2016 | Lee | | H04L 61/103 |
| 9,503,276 B2* | 11/2016 | Ng | | H04L 45/66 |
| 9,661,031 B1 | 5/2017 | Bennett | | H04L 61/256 |
| 9,736,005 B2* | 8/2017 | Christenson | | H04L 69/40 |
| 9,948,598 B2* | 4/2018 | Ikeda | | H04L 61/103 |
| 9,984,036 B2* | 5/2018 | Akiyoshi | | H04L 49/30 |
| 10,091,106 B2* | 10/2018 | Xu | | H04L 12/4675 |
| 10,243,888 B2* | 3/2019 | Bennett | | H04L 49/351 |
| 10,257,152 B2* | 4/2019 | Wang | | H04L 49/201 |
| 10,298,494 B2* | 5/2019 | Kamper | | H04L 45/74 |
| 10,516,645 B1* | 12/2019 | Patel | | H04L 61/103 |
| 10,574,647 B2* | 2/2020 | Ogawa | | H04L 63/083 |
| 10,644,946 B2* | 5/2020 | Harneja | | H04L 41/06 |
| 10,693,854 B2* | 6/2020 | Naccache | | H04W 12/06 |
| 10,694,555 B2* | 6/2020 | Zhang | | H04L 61/5092 |
| 10,778,659 B2* | 9/2020 | Tola | | H04L 9/14 |
| 10,805,258 B2* | 10/2020 | Cheng | | H04L 61/103 |
| 10,825,324 B2* | 11/2020 | Haviv | | H04W 12/126 |
| 10,826,691 B2* | 11/2020 | Rohel | | H04L 63/062 |
| 10,911,368 B2* | 2/2021 | Gillon | | H04L 47/283 |
| 10,986,174 B1* | 4/2021 | Sharma | | H04L 12/4641 |
| 11,012,407 B2* | 5/2021 | Ballard | | H04L 61/251 |
| 11,032,143 B2* | 6/2021 | Patterson | | H04L 41/0806 |
| 11,102,053 B2* | 8/2021 | Ponnuswamy | | H04L 43/04 |
| 11,108,594 B2* | 8/2021 | Xu | | H04L 49/45 |
| 11,113,377 B2* | 9/2021 | Ogawa | | H04L 63/0853 |
| 11,138,844 B2* | 10/2021 | Kim | | G06T 7/20 |
| 11,283,680 B2* | 3/2022 | Kompella | | H04L 41/122 |
| 11,336,437 B2* | 5/2022 | Beck | | H04L 9/0836 |
| 11,343,150 B2* | 5/2022 | Harneja | | H04L 41/145 |
| 11,470,115 B2* | 10/2022 | Vissamsetty | | H04L 63/20 |
| 11,616,810 B2* | 3/2023 | Hansen | | G06F 21/552 |
| | | | | 713/188 |
| 11,757,935 B2* | 9/2023 | Sharma | | H04L 61/103 |
| | | | | 726/22 |
| 11,888,809 B2* | 1/2024 | Gao | | H04L 49/354 |
| 2003/0177220 A1* | 9/2003 | Ohara | | H04L 61/5092 |
| | | | | 709/222 |
| 2008/0008192 A1* | 1/2008 | Matoba | | H04L 61/103 |
| | | | | 370/395.54 |
| 2011/0078282 A1* | 3/2011 | Wei | | H04L 67/06 |
| | | | | 709/219 |
| 2011/0138058 A1* | 6/2011 | Ishida | | H04L 69/16 |
| | | | | 709/227 |
| 2013/0044754 A1* | 2/2013 | Zhu | | H04L 61/103 |
| | | | | 370/392 |
| 2015/0071289 A1* | 3/2015 | Shin | | H04L 49/25 |
| | | | | 370/392 |
| 2016/0173356 A1 | 6/2016 | Jiang et al. | | |
| 2016/0373356 A1* | 12/2016 | Xu | | H04L 45/18 |
| 2022/0131860 A1* | 4/2022 | Hwang | | H04L 61/103 |
| 2022/0383309 A1* | 12/2022 | Hakoda | | G06Q 20/3224 |

FOREIGN PATENT DOCUMENTS

| | | | |
|---|---|---|---|
| JP | 2012-199758 A | 10/2012 | |
| JP | 2016-187113 A | 10/2016 | |
| JP | 2018-157460 A | 10/2018 | |
| JP | 2019-106583 A | 6/2019 | |
| KR | 10-0478910 B1 | 3/2005 | |
| KR | 10-0779072 B1 | 11/2007 | |
| KR | 10-0893935 B1 | 4/2009 | |
| KR | 10-1091780 B1 | 12/2011 | |
| KR | 10-2018-0103487 A | 9/2018 | |
| WO | WO-2009003394 A1 * | 1/2009 | ....... H04L 29/12028 |
| WO | WO-2024227293 A1 * | 11/2024 | |

* cited by examiner

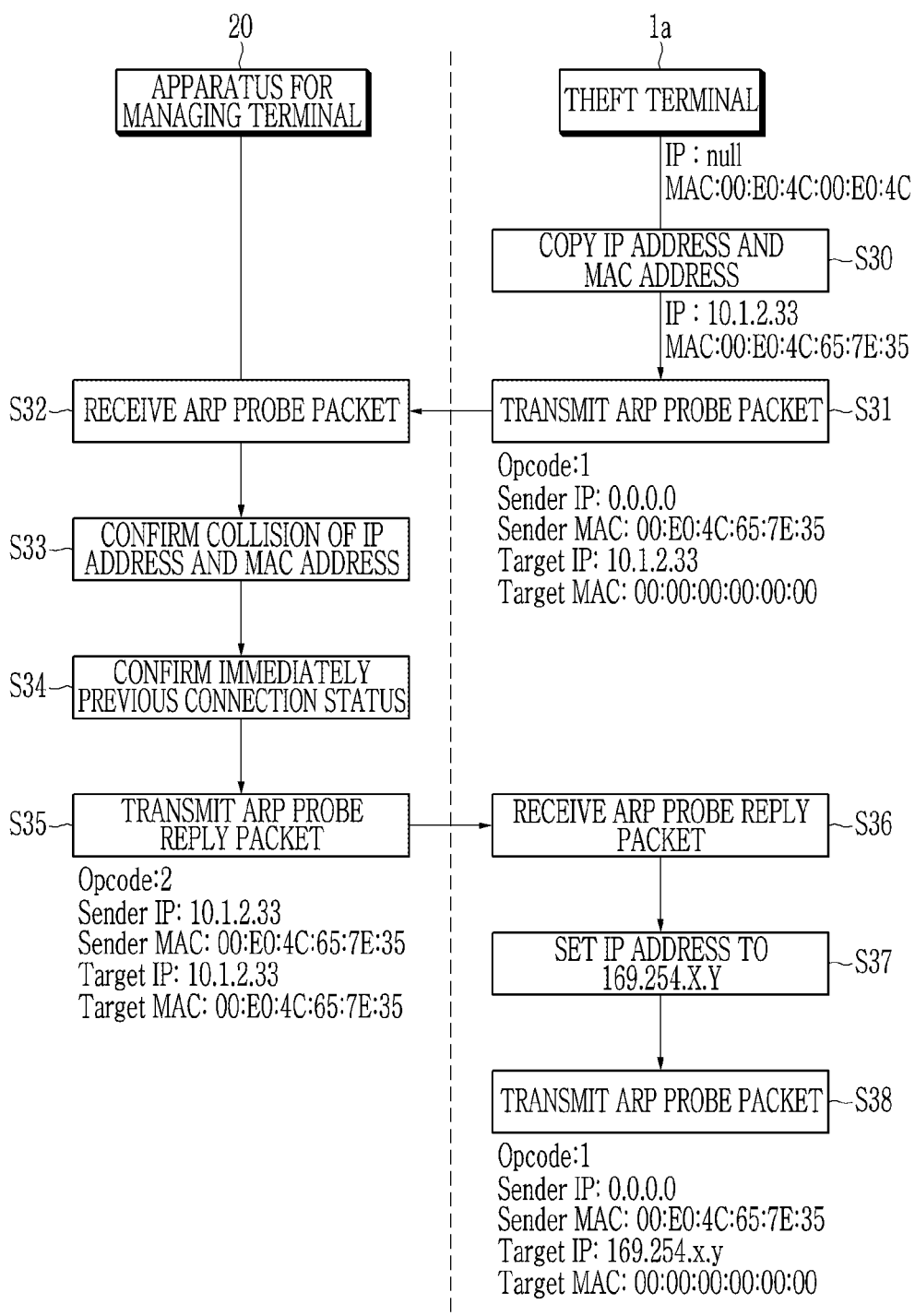

APPARATUS AND METHOD FOR MANAGING TERMINAL IN NETWORK

CROSS-REFERENCE TO RELATED APPLICATIONS

The present application is a national phase entry of International Application No. PCT/KR2022/006448, filed May 4, 2022, which claims priority to Korean Patent Application No. 10-2021-0120559, filed Sep. 9, 2021, and Korean Patent Application No. 10-2022-0008109, filed Jan. 19, 2022, which are incorporated herein by reference in their entirety.

TECHNICAL FIELD

The present disclosure relates to an apparatus and method for managing a terminal in a network and more particularly, to an apparatus and method for managing a terminal for blocking a theft terminal that duplicates and uses IP/MAC addresses on a network.

BACKGROUND ART

In a general communication network environment, a terminal performs communication using an internet protocol (IP) address and a media access control (MAC) address.

In the IP protocol, the IP address and MAC address are used to identify communication targets without any verification procedures. Therefore, in the network using the IP protocol, the IP/MAC addresses of a normal terminal normally connected to the network may be easily duplicated by a malicious user. A theft terminal that duplicates the IP/MAC addresses of the normal terminal may cause problems in the network use of the normal terminal by directly modifying the IP/MAC addresses of the normal terminal in the network and causing an IP conflict. In addition, the theft terminal may cause security problems such as hacking, cracking, and wiretapping by intercepting packets transmitted to the normal terminal.

DISCLOSURE

Technical Problem

The present disclosure attempts to provide an apparatus and method for managing a terminal capable of identifying and blocking a theft terminal that duplicates and uses IP/MAC addresses on a network.

Technical Solution

According to an embodiment of the present disclosure, a method for managing a terminal in a network system may include: analyzing packets received from a plurality of terminals connected to the network to collect and store address data of the plurality of terminals and status information indicating a network connection status of each of the plurality of terminals; receiving an address resolution protocol (ARP) probe packet; acquiring, from the ARP probe packet, a first internet protocol (IP) address and a first media access control (MAC) address of a first terminal that transmits the ARP probe packet; determining whether the first terminal is a theft terminal that duplicates address data of another terminal according to status information of a terminal that has the same address data as the first IP address and the first MAC address among the plurality of terminals, when address data including the same IP address and MAC address as the first IP address and the first MAC address is searched among pre-stored address data; and transmitting a reply packet to the ARP probe packet to the first terminal so that the IP address of the first terminal is reset to a second IP address by an automatic private IP addressing (APIPA) function of the first terminal, when the first terminal is determined to be the theft terminal.

The second IP address may be an IP address from which access to the network is blocked.

The method may further include transmitting the reply packet to the ARP probe packet to the first terminal according to a preset preemptive IP protection/MAC static policy, when address data including the same IP address as the first IP address and a MAC address different from the first MAC address is searched among the address data.

The method may further include storing address data binding the first IP address and the first MAC address when the address data including the same IP address and MAC address as the first IP address and the first MAC address is not searched among the address data.

The method may further include updating a MAC table of a switch using the pre-stored address data and simple network management protocol.

In a header of the ARP probe packet, an Opcode may be 1, a sender MAC address may be the first MAC address, a sender IP address may be 0.0.0.0, a target MAC address may be 00:00:00:00:00:00, and a target IP address may be the first IP address.

In a header of the reply packet, an Opcode may be 2, a sender MAC address may be the first MAC address, a sender IP address may be the first IP address, a target MAC address may be the first MAC address, and a target IP address may be the first IP address.

The collecting and storing may include setting the status information of the second terminal to indicate an online status, when the IP packet or the ARP packet is received from the second terminal within the network.

The collecting and storing may include: transmitting an ARP request packet to the third terminal, when the IP packet or the ARP packet is not received from a third terminal among the plurality of terminals for a first time; and setting the status information of the third terminal to indicate an offline status, when a reply packet to the ARP request packet is not received for a second time.

The determining may include determining the first terminal as the theft terminal, when status information of a terminal corresponding to the first IP address and the first MAC address among the plurality of terminals indicates an online status.

According to another embodiment of the present disclosure, an apparatus for managing a terminal may include: a communication unit that communicates with a plurality of terminals connected to a network; a storage unit that stores status information and address data indicating a network connection status for each of the plurality of terminals; and a control unit that analyzes packets received from the plurality of terminals to collect the status information and the address data, acquires, from an ARP probe packet, a first IP address and a first MAC address of a first terminal that transmits the ARP probe packet when the ARP probe packet is received, determines whether the first terminal is a theft terminal that duplicates address data of another terminal according to status information of a terminal having the same address data as the first IP address and the first MAC address among the plurality of terminals when address data including the same IP address and MAC address as the first IP address and the first MAC address is searched among the address data stored in the storage unit, and transmits a reply packet to the ARP probe packet to the first terminal so that the IP address of the first terminal is reset to a second IP address by an APIPA function of the first terminal, when the first terminal is determined to be the theft terminal.

The second IP address may be an IP address from which access to the network is blocked.

The control unit may transmit the reply packet to the ARP probe packet to the first terminal according to a preset preemptive IP protection/MAC static policy, when address data including the same IP address as the first IP address and a MAC address different from the first MAC address is searched among the address data.

The control unit may store, in the storage unit, address data binding the first IP address and the first MAC address, when the address data including the same IP address and MAC address as the first IP address and the first MAC address is not searched among the address data.

The control unit may update a MAC table of a switch using address data stored in the storage unit and simple network management protocol.

In a header of the ARP probe packet, an Opcode may be 1, a sender MAC address may be the first MAC address, a sender IP address may be 0.0.0.0, a target MAC address may be 00:00:00:00:00:00, and a target IP address may be the first IP address.

In a header of the reply packet, an Opcode may be 2, a sender MAC address may be the first MAC address, a sender IP address may be the first IP address, a target MAC address may be the first MAC address, and a target IP address may be the first IP address.

The control unit may set the status information of the second terminal to indicate an online status, when the IP packet or the ARP packet is received from the second terminal within the network.

The control unit may transmit an ARP request packet to the third terminal when the IP packet or the ARP packet is not received from a third terminal among the plurality of terminals for a first time, and set the status information of the third terminal to indicate an offline status when the reply packet to the ARP request packet is not received for a second time.

The control unit may determine the first terminal as the theft terminal, when status information of a terminal corresponding to the first IP address and the first MAC address among the plurality of terminals indicates an online status.

Advantageous Effects

According to the present disclosure, it is possible to identify and block the terminals that duplicate and use IP/MAC addresses on the network, thereby protecting the network use of the terminals that are normally using the network.

DESCRIPTION OF THE DRAWINGS

FIG. 3 is a diagram illustrating an example in which an apparatus for managing a terminal according to an embodiment blocks a theft terminal.

MODE FOR INVENTION

Figure 1:
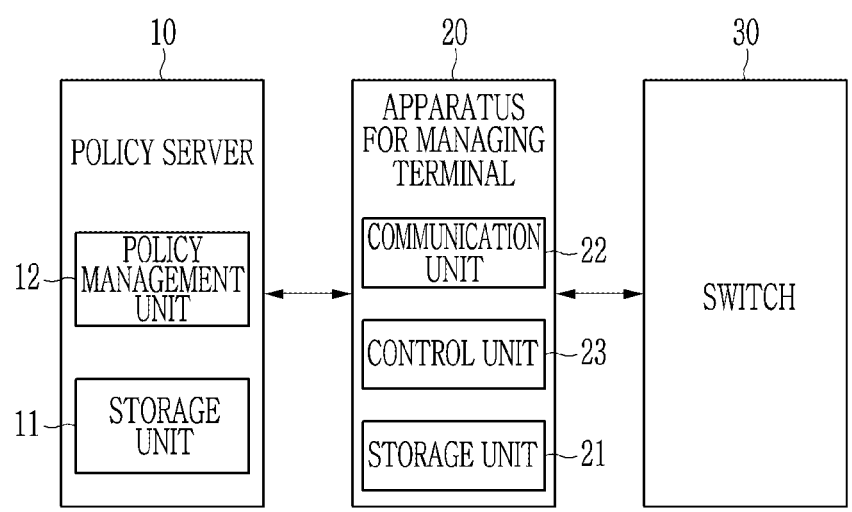
FIG. 1 is a diagram schematically illustrating a network system according to an embodiment.

Hereafter, embodiments of the present disclosure will be described in detail with reference to the accompanying drawings and the same or similar components are given the same reference numerals and are not repeatedly described. The suffix "module" and/or "unit" for components used in the following description is given or mixed in consideration of only the ease of writing of the specification, and therefore, do not have meanings or roles that distinguish from each other in themselves. Further, when it is decided that a detailed description for the known art related to the present disclosure may obscure the gist of the present disclosure, the detailed description will be omitted. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including an ordinal number such as first, second, etc., may be used to describe various components, but the components are not limited to these terms. The above terms are used solely for the purpose of distinguishing one component from another.

Singular forms are to include plural forms unless the context clearly indicates otherwise.

It will be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

Hereinafter, an apparatus and method for managing a terminal in a network according to embodiments will be described in detail with reference to necessary drawings.

FIG. 1 schematically illustrates a network system according to an embodiment.

In the following description, a terminal that is normally connected to a network is referred to as a 'normal terminal', and a terminal that steals and uses an IP address and a MAC address of a normal terminal is referred to as a 'theft terminal'.

Referring to FIG. 1, a network system according to an embodiment may include a policy server 10, an apparatus 20 for managing a terminal, and a switch 30.

The policy server 10 may perform a function of setting and managing a policy (access management policy) for connection authentication, authorization, account operations, etc., for network access in the network system. The access management policy may include bound address data (IP address and MAC address) of hosts connected to the network in the form of a table. The access management policy may include a network management range for managing an IP conflict, reply policies (e.g., whether to transmit IP conflict reply packet (address resolution protocol (ARP) probe reply (ARP probe reply) packet, whether to apply preemptive IP protection/MAC static policy, etc.) when the IP conflict occurs.

The policy server 10 may include a database 11 that stores policy information such as access management policies, and a policy management unit 12 that manages the policy information stored in the database 11.

The policy management unit 12 may receive the bound address data (IP address and MAC address) from a control unit 23 of the apparatus 20 for managing a terminal and store the received bound address data in the database 11. In addition, the policy management unit 12 may transmit the policy information to the apparatus 20 for managing a terminal upon request from the apparatus 20 for managing a terminal.

The apparatus 20 for managing a terminal may detect the theft terminal on the network and block the theft terminal from using the network.

The apparatus 20 for managing a terminal may include a storage unit 21, a communication unit 22, and the control unit 23.

The storage unit 21 may store various information, data, etc., processed by the apparatus 20 for managing a terminal. For example, the storage unit 21 may store address data (IP address and MAC address) of terminals collected by the apparatus 20 for managing a terminal. In addition, for example, status information (online status or offline status) of the terminals collected by the apparatus 20 for managing a terminal, the time of generation of the last packet of each terminal, etc., may also be stored. In addition, for example, the storage unit 21 may store the policy information received from the policy server 10.

The communication unit 22 may perform communication functions such as transmitting and receiving packets between the apparatus 20 for managing a terminal and an external unit (e.g., a terminal (not illustrated), policy server 10, switch 30, etc.).

The control unit 23 may control the overall operation of the apparatus 20 for managing a terminal.

The control unit 23 may operate as a probe apparatus that collects packets (e.g., ARP packet or IP packet) of the terminals connected to the same network as the apparatus 20 for managing a terminal through the communication unit 22. Here, the range of the same network is divided based on a use of a router, and may be indicated by the same broadcast domain. In the network system, a router divides networks and blocks broadcasts from being transmitted to other networks. In this case, the range within which the broadcast reaches is called the broadcast domain.

The control unit 23 may acquire the address data (IP address and MAC address) of each terminal by analyzing the collected packets (e.g., ARP packet or IP packet). That is, when the packet is received, the control unit 23 may acquire address data (sender IP address (source IP or sender IP) and sender MAC address (source MAC or sender MAC)) of a sender terminal from the corresponding packet. When the address data of the sender terminal is acquired from the received packet, the control unit 23 may confirm whether the terminal is a new terminal by comparing the acquired address data with address data of pre-stored terminals. That is, when the control unit 23 does not search for the same address data as the address data acquired from the received packet among the pre-stored address data of the terminals, the control unit 23 may determine that the terminal transmitting the corresponding packet is a new terminal newly connected to the network. When the control unit 23 confirms that the terminal transmitting the packet is the new terminal, the control unit 23 may bind the IP address and MAC address of the sender terminal acquired from the packet by mapping the IP address and MAC address 1 to N, and store the bound address data (IP address and MAC address) in the storage unit 21. The control unit 23 may also transmit the bound address data to the policy server 10.

The control unit 23 may acquire status information (online status or offline status) of each terminal by analyzing the collected packets. Here, the online status may indicate a state in which the connection between the corresponding terminal and the network is activated, and the offline status may indicate a state in which the connection between the corresponding terminal and the network is deactivated. When the terminal that transmits the corresponding packet is confirmed based on sender address data of the packet received from the terminal, the control unit 23 may set the status information of the corresponding terminal to indicate the online status.

When the control unit 23 analyzes the collected packets to identify a terminal that does not transmit a packet for a predetermined period of time among the terminals (i.e. terminals registered as connected to the network) whose address data is stored in the storage unit 21, the control unit 23 may transmit an ARP request packet to the corresponding terminal to confirm the status of the terminal. Then, the control unit 23 may wait to receive the reply packet to the ARP request packet from the terminal for a predetermined period of time (e.g., 3 seconds), and determine that the corresponding terminal is in the offline status when the reply packet is not received within the predetermined period of time. Accordingly, the control unit 23 may change the corresponding status information so that the status information of the corresponding terminal indicates the offline status. To this end, the control unit 23 may continuously acquire the last packet reception time (or the last packet generation time) for each terminal, and store and manage the acquired last packet reception time in the storage unit 21 for each terminal.

The control unit 23 may acquire additional data such as a network basic input/output system (NetBIOS) name and a network activation time of each terminal from the collected packets, and store the acquired additional data in the storage unit 21.

The control unit 23 may operate as a theft detection apparatus that collects the ARP probe packets transmitted from the terminals connected to the same network and uses the collected ARP probe packets to detect the theft terminal within the network management range managed by the apparatus 20 for managing a terminal. The control unit 23 may receive information on the network management range from the policy server 10 through the communication unit 22. The network management range may include information on an IP address band that the apparatus 20 for managing a terminal should manage to detect the theft terminal. When the control unit 23 receives the network management range from the policy server 10, the control unit 23 may collect the address data from the IP address band defined by the network management range and detect the IP address conflict.

In RFC 5227 that is the IPv4 address conflict detection (proposed standard), address conflict detection (ACD) using the ARP probe packet and an ARP announcement packet is specified.

In the ACD, the ARP probe packet is a packet used when a host confirms whether its IP address is already in use within a network (broadcast domain) that the host belongs to, and is used to prevent the IP conflict. The host sets an ARP Opcode to 1, broadcasts the ARP probe packet set as the ARP request within the network that the host belongs to, and waits to receive the reply packet (packet having an ARP Opcode of 2) thereto. When transmitting the ARP probe packet (ARP request), the host may set the sender MAC address in the header to its own MAC address and set the Sender IP address to 0.0.0.0. In addition, the host may set a target MAC address of the ARP probe packet header to 00:00:00:00:00:00, and set a target IP address to its own IP address. The ARP probe packet may differ from a gratuitous ARP (GARP) packet in that it does not update an ARP cache of other hosts belonging to the same network to prevent the IP address conflict. The GARP packet may be used to allow all the hosts connected to the same network as the corresponding host to update their ARP cache when the host transmits the GARP packet.

In the ACD, the ARP announcement packet is a packet used to assert (or claim) the use of the corresponding IP address when no response is received after transmitting the ARP probe packet. When the reply packet is not received after transmitting the ARP probe packet, the host may transmit an ARP announcement packet to claim the use of the corresponding IP address. The ARP announcement packet is similar to the GARP packet in that it updates the ARP caches of other hosts, but the Opcode is set to 1, which indicates a request packet, and is different from the GARP packet in which the Opcode is set to 2.

In the network system, when the IP address changes, the terminal operates to repeatedly broadcast the ARP probe packet. Therefore, a theft terminal that duplicates address data of another terminal to change its IP address and MAC address broadcasts an ARP probe packet within a network to which the duplicated IP address belongs. As described above, the ARP probe packet (ARP request) transmitted from each host (terminal) may include an IP address and an MAC address of a host that transmits the ARP probe packet. Therefore, when the control unit 23 receives the ARP probe packet transmitted as the ARP request from the terminal, the control unit 23 may detect the IP address and MAC address of the corresponding terminal from the collected ARP probe packet, and compare the detected IP address and MAC address in the address data stored in the storage unit 21 to determine whether the corresponding terminal is the theft terminal that duplicates and uses the address data of another terminal.

Since the IP address on the network may be arbitrarily set by a user, IP conflict may occur not only through malicious access but also through the user's mistake. In addition, the IP address may be duplicately issued due to an error in a dynamic host configuration protocol (DHCP) server. Therefore, in this embodiment, in order to distinguish between cases where the IP address conflict occurs due to the user's mistake or the error in the DHCP server and the malicious theft, it may be determined whether there is a conflict between not only the IP address but also the MAC address to detect the malicious theft terminal. The MAC address is unique identification information of a terminal, so a situation where the MAC address overlaps with that of another terminal due to the user's mistake may not occur. Therefore, when the ARP probe packet having the same IP address and MAC address as address data stored in the past occurs, the terminal that transmits the packet may be a terminal that attempts a malicious illegal intrusion into the network, or a terminal that snips packets from a normal terminal to attempt wiretapping or data theft attacks.

Therefore, when the address data newly collected through the ARP probe packet and the address data having the same IP address and MAC address already exist in the storage unit 21, the control unit 23 may determine the terminal that transmits the ARP probe packet as the theft terminal.

Meanwhile, in a network system, in addition to when the IP address changes, the terminal may transmit the ARP probe packet in situations such as when a network interface transitions from an inactive status to an active status, when the terminal returns from a sleep mode to a normal mode, when a change occurs in a link status (e.g., connection status of an Ethernet cable) with the network system, and when an 802.11 wireless interface is associated with a new base station. That is, even the normal terminal, not the theft terminal, may repeatedly broadcast the ARP probe packet when its connection to the network transitions from an offline status to an online status.

Therefore, in this embodiment, in order to prevent the normal terminal from being mistakenly recognized as the theft terminal, the status information of the terminal that transmits the ARP probe packet may be additionally confirmed. When the address data having the same IP address and MAC address as the address data newly collected through the ARP probe packet already exists in the storage unit 21, the control unit 23 may additionally confirm the status information before receiving the ARP probe packet of the corresponding terminal to finally determine whether the corresponding terminal is the theft terminal. That is, when the status information of the corresponding terminal indicates the offline status before receiving the ARP probe packet, the control unit 23 may determine that the received ARP probe packet is received from the normal terminal whose connection status with the network transitions to the online status to finally determine that the corresponding terminal is the normal terminal rather than the theft terminal.

When the theft terminal is detected, the control unit 23 may operate as a blocking apparatus that transmits a network use blocking packet (ARP probe reply packet) to block the theft terminal from using the network.

When a terminal using an operating system (OS) of Windows 8 or higher or a terminal using MAC OS 9 or higher receives a reply packet to an ARP probe packet the terminal transmits, the terminal sets its IP address to an IP address automatically assigned by an automatic private IP addressing (APIPA) function rather than to an IP address set by a user. The APIPA is a function that automatically assigns an IP address in the Windows operating system in a network environment where there is no DHCP server or a DHCP server is not available. The Internet Assigned Numbers Authority (IANA) has reserved IP addresses 169.254.0.0 to 169.254.255.255 for the APIPA. Therefore, the IP address automatically assigned by APIPA may be guaranteed not to conflict with a routing address.

As described above, the theft terminal that has received the reply packet to the ARP probe packet transmitted by the control unit 23 is automatically assigned IP address 169.254.x.y (where x and y are a unique IP address of a terminal) by the APIPA function, and will not access the network to which the IP address stolen by the theft terminal belongs.

When the theft terminal is detected, whether to transmit the ARP probe reply packet may be determined according to the access management policy stored in the policy server 10. That is, when the policy information received from the policy server 10 indicates transmission of a blocking packet when the theft terminal is detected, the control unit 23 may transmit the ARP probe reply packet when the theft terminal is detected.

Meanwhile, the control unit 23 may determine that the IP address duplication has occurred when the newly collected address data through the ARP probe packet has the same IP address as the address data of another previously bound terminal but has a different MAC address. The control unit 23 may transmit the reply packet to the ARP probe packet to the corresponding terminal even in the case of the IP address duplication rather than the address theft according to the access management policy. That is, the control unit 23 may transmit the reply packet to the ARP probe packet even when the IP duplication is detected according to the preemptive IP protection/MAC static policy among the access management policies. Even in this case, the terminal that receives the reply packet to the ARP probe packet the terminal transmits is automatically assigned the IP address 169.254.x.y by the APIPA function.

Meanwhile, when the terminal automatically assigned the IP address 169.254.x.y by the APIPA function is the terminal using the Windows operating system, the terminal may transmit the ARP probe packet to use the IP address assigned by the APIPA.

Accordingly, when the ARP probe packet including the IP address 169.254.x.y is received through the communication unit 22, the control unit 23 may determine that the operating system of the terminal that transmits the ARP probe packet is Windows. On the other hand, when the ARP probe packet is not transmitted from the corresponding terminal after transmitting the reply packet to the ARP probe packet, the control unit 23 may determine that the corresponding terminal is a terminal using operating systems other than Windows.

The control unit 23 may update a MAC table (port-MAC binding data table) of the switch 30 by the packet transmitted by the theft terminal, and periodically update the MAC table of the switch 30 using simple network management protocol (SNMP) to prevent the packet of the normal terminal from being transmitted to the theft terminal. That is, the control unit 23 may periodically update the MAC table of the switch 30 based on the address data stored in the storage unit 21.

In the above-described apparatus 20 for managing a terminal, the control unit 23 may be composed of a processor implemented as a central processing unit (CPU), other chipsets, a microprocessor, etc.

Hereinafter, a method for managing a terminal of the apparatus 20 for managing a terminal according to an embodiment will be described in detail with reference to FIGS. 2 and 3.

Figure 2:
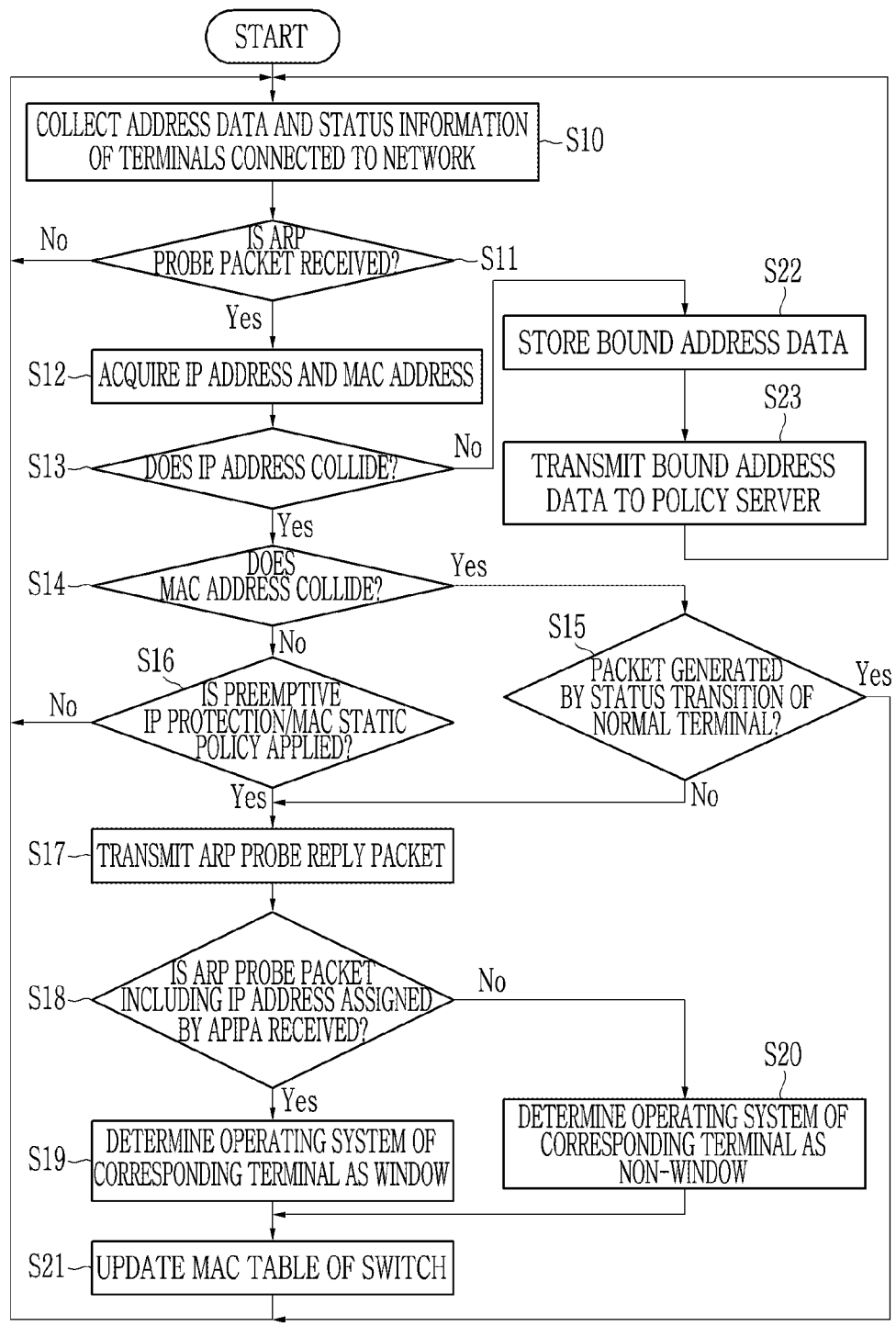
FIG. 2 is a diagram schematically illustrating a method for managing a terminal in a network system according to an embodiment.

FIG. 2 schematically illustrates a method for managing a terminal in a network system according to an embodiment. The method for managing a terminal of FIG. 2 may be performed by the apparatus 20 for managing a terminal described above with reference to FIG. 1.

Referring to FIG. 2, the apparatus 20 for managing a terminal may collect address data and status information of terminals connected to the network to which the apparatus 20 for managing a terminal belongs (S10).

In step S10, the apparatus 20 for managing a terminal may analyze IP packets or ARP packets received from terminals to acquire address data for each terminal. When the IP packet or ARP packet is received from the terminal, the apparatus 20 for managing a terminal may acquire sender address data (sender IP address and sender MAC address) from the corresponding packet. When the apparatus 20 for managing a terminal acquires the sender address data from the received packet, the apparatus 20 for managing a terminal may compare the sender address data with pre-stored address data of the terminals to confirm whether a sender of the corresponding packet is a new terminal. That is, when the apparatus 20 for managing a terminal does not search for the same address data as the address data acquired from the received packet among the pre-stored address data of the terminals, the apparatus 20 for managing a terminal may determine that the terminal transmitting the corresponding packet is a new terminal newly connected to the network. When the apparatus 20 for managing a terminal confirms that the terminal transmitting the packet is the new terminal, the apparatus 20 for managing a terminal may bind the IP address and MAC address of the sender (terminal) acquired from the packet by mapping the IP address and MAC address 1 to N, and store the bound address data (IP address and MAC address) in the storage unit 21.

In step S10, the apparatus 20 for managing a terminal may analyze the IP packets or ARP packets received from terminals to acquire status information indicating a network connection status of each terminal. When the IP packet or ARP packet is received from the terminal, the apparatus 20 for managing a terminal may confirm the terminal that transmits the corresponding packet based on the sender address data of the received packet, and may set so that the status information of the terminal for which the packet transmission has been confirmed indicates the online status. On the other hand, when the apparatus 20 for managing a terminal confirms a terminal that has not transmitted the IP packet or the ARP packet for a predetermined period of time among terminals connected to the same network as the apparatus 20 for managing a terminal, the apparatus 20 for managing a terminal may transmit the ARP request packet to the corresponding terminal to confirm the status of the corresponding terminal. Then, the apparatus 20 for managing a terminal may wait for the reception of the reply packet to the ARP request packet from the terminal for a predetermined time (e.g., 3 seconds), and determine that the corresponding terminal is in the offline status when the reply packet is not received from the corresponding terminal within the predetermined time. Accordingly, the apparatus 20 for managing a terminal may change the corresponding status information to indicate an offline status of the corresponding terminal. The apparatus 20 for managing a terminal may identify the terminals connected to the same network as the apparatus 20 for managing a terminal based on the address data stored in the storage unit 21.

When the ARP probe packet is received within the network (broadcast domain) to which the apparatus 20 for managing a terminal belongs (S11), the IP address and MAC address of the corresponding terminal may be acquired from the ARP probe packet (S12).

In step S12, the apparatus 20 for managing a terminal may confirm an IP address band assigned thereto based on a network management range (IP address band) received from the policy server 10, and acquire the IP address and MAC address within the IP address band assigned thereto. That is, the apparatus 20 for managing a terminal may collect an IP addresses and an MAC addresses only for an ARP probe packet that includes the IP address belonging to the IP address band assigned thereto among the ARP probe packets broadcast within the network to which the apparatus 20 for managing a terminal belongs. Therefore, the IP address band in which the IP address is collected by the apparatus 20 for managing a terminal may be the entire IP address band used in the network to which the apparatus 20 for managing a terminal belongs according to the network management range received from the policy server 10, and may be part of the IP address band used in the network to which the apparatus 20 for managing a terminal belongs.

The apparatus 20 for managing a terminal, which collects the IP address and MAC address from the ARP probe packet, compares the IP address acquired through step S11 with the pre-stored address data (IP address and MAC address) to determine whether there is an IP address conflict (S13). In step S13, the apparatus 20 for managing a terminal may determine that the IP address conflict has occurred when there is address data that has the same IP address as the IP address acquired through step S12 among the pre-stored address data.

When it is determined that the IP address conflict has occurred, the apparatus 20 for managing a terminal may compare the MAC address acquired through step S12 with the pre-stored address data (IP address and MAC address) to determine whether there is the MAC address conflict (S14). In step S14, when the address data including the same IP address as the IP address acquired through step S12 is detected, the apparatus 20 for managing a terminal may compare that the MAC address of the corresponding address data is the same as the MAC address acquired through step S12, and when the two MAC addresses are the same, may be determined that the MAC address conflict has occurred.

When it is determined that the conflict has occurred in both the IP address and MAC address through steps S13 and S14, the apparatus 20 for managing a terminal may determine whether the corresponding ARP probe packet is a packet generated by a status transition of a normal terminal based on the pre-stored status information of the terminal (S15).

In step S15, the apparatus 20 for managing a terminal may confirm the status information of the terminal indicated by the IP address and MAC address acquired through step S12 among the pre-stored status information. As a result of confirming the status information, when an immediately previous status of the corresponding terminal, that is, the status before receiving the ARP probe packet, is an offline status, the apparatus 20 for managing a terminal may determine that the ARP probe packet received through step S11 is not a packet generated by address theft, but a packet generated when the normal terminal transits a connection status from the offline status to the online status.

On the other hand, as a result of confirming the status information, when if the immediately previous status of the terminal, that is, the status before receiving the ARP probe packet, is the online status, the apparatus 20 for managing a terminal may determine that the ARP probe packet received through step S11 is a packet generated by the theft terminal.

In step S15, when it is determined that the ARP probe packet is not the packet generated by the status transition of the normal terminal, that is, when it is determined that the ARP probe packet is the packet generated by the theft terminal, the apparatus 20 for managing a terminal may transmit the ARP probe reply packet, which is a network use blocking packet, according to the policy information received from the policy server 10 (S17).

When it is determined that the MAC address conflict has not occurred in step S14, the apparatus 20 for managing a terminal may determine that the IP address conflict has occurred due to IP address duplication settings rather than theft. In this case, the apparatus 20 for managing a terminal may confirm the policy information received from the policy server 10 to confirm whether the preemptive IP protection/MAC static policy is being applied (S16), and transmit the ARP probe reply packet when the corresponding policy is being applied (S17).

Accordingly, the terminal that receives the ARP probe reply packet for the ARP probe packet it transmits is automatically assigned IP address 169.254.x.y by the APIPA function. In addition, when the operating system the terminal uses is Windows, the terminal may retransmit the ARP probe packet to use the IP address assigned by the APIPA.

Therefore, after transmitting the ARP probe reply packet, the apparatus 20 for managing a terminal may confirm whether the ARP probe packet including the IP address (169.254.x.y) automatically assigned by the APIPA is received for a predetermined period of time (S18), and may determine that the operating system of the corresponding terminal is Windows when the corresponding ARP probe packet is received (S19). On the other hand, when the reception of the ARP probe packet including the IP address 169.254.x.y is not confirmed for more than a predetermined period of time, it may be determined that the operating system of the corresponding terminal is non-Windows (e.g., Mac OS) (S20).

Thereafter, the apparatus 20 for managing a terminal periodically updates the MAC table of the switch 30 using the SNMP protocol (S21), so the MAC table (port-MAC binding data table) of the switch 30 is updated by the packet transmitted by the thief terminal, thereby preventing the packet of the normal terminal from being transmitted to the theft terminal.

Meanwhile, when it is determined that the ARP probe packet received through step S12 does not correspond to the IP address conflict, the apparatus 20 for managing a terminal may store the bound address data of the IP address and MAC address acquired from the corresponding ARP probe packet in the internal storage unit 21 (S22). In addition, the apparatus 20 for managing a terminal may transmit the bound address data to the policy server 10 (S23), thereby synchronizing the address data (bound IP address and MAC address) stored in the policy server 10 and the address data (bound IP address data and MAC address) stored in the internal storage unit 21 with each other.

FIG. 3 illustrates an example in which the apparatus 20 for managing a terminal according to an embodiment blocks a theft terminal 1*a*.

Referring to FIG. 3, the theft terminal 1*a* duplicates an IP address (10.1.2.33) and an MAC address (00:E0:4C:65:7E:35) of a normal terminal (not illustrated) already connected to a network and changes its IP address (null) and MAC address (00:E0:4C:00:E0:4C) (S30).

As the IP address changes, the theft terminal 1*a* transmits the ARP probe packet (S31). In this case, the ARP probe packet may include an Opcode 1, a sender IP address (sender IP) 0.0.0.0, a sender MAC address (sender MAC) 00:E0:4C:65:7E:35 (stolen MAC address), a target IP address (Target IP) 10.1.2.33 (stolen IP address), and a target MAC address (Target MAC) 00:00:00:00:00:00.

The apparatus 20 for managing a terminal receives the ARP probe packet transmitted by the theft terminal 1*a* (S32). In addition, the apparatus 20 for managing a terminal detects the IP address and MAC address of the terminal that transmits the received ARP probe packet and compares the detected IP address and MAC address with the pre-stored address data to confirm whether the IP address and MAC address conflict (S33).

Since the normal terminal whose IP address and MAC address are duplicated by the theft terminal 1*a* is already using the network, an IP address (10.1.2.33) and a MAC address (00:E0:4C:65:7E:35) of the normal terminal that the theft terminal 1*a* duplicates are already collected by the apparatus 20 for managing a terminal and stored in the internal storage unit 21 of the apparatus 20 for managing a terminal. Therefore, the IP address (10.1.2.33) and the MAC address (00:E0:4C:65:7E:35) extracted from the ARP probe packet transmitted by the theft terminal 1*a* conflicts with the address data pre-stored in the apparatus 20 for managing a terminal.

The apparatus 20 for managing a terminal, which has confirmed the conflict between the IP address and MAC address, confirms the immediately previous connection status of the terminal (normal terminal) indicated by the corresponding IP address and MAC address based on the pre-stored status information, that is, the connection status before transmitting the ARP probe packet (S34). Since the theft terminal 1a has duplicated the IP address and MAC address of the normal terminal currently connected to the network, the immediately previous connection status of the terminal (normal terminal) indicated by the IP address and MAC address may be confirmed as the online status.

Accordingly, the apparatus 20 for managing a terminal determines that the conflict between the IP address and MAC address has occurred due to the address duplication, and transmits the reply packet to the ARP probe packet in order to block the network use by the theft terminal 1a (S35). In this case, the ARP probe reply packet may include an Opcode 2, a sender IP address 10.1.2.33 (IP address of the theft terminal 1a), and a sender MAC address 00:E0:4C:65:7E:35 (MAC address of the theft terminal 1a), a target IP address (Target IP) 10.1.2.33 (IP address of the theft terminal 1a), and a target MAC address (Target MAC) 00:00:00:00:00:00.

The theft terminal 1a, which has received the ARP probe reply packet from the apparatus 20 for managing a terminal (S36), recognizes that IP address 10.1.2.33 may not be used, and changes its IP address to 169.254.x.y through the APIPA function. (S37). In addition, when the operating system of the theft terminal 1a is Windows, the theft terminal 1a retransmits the ARP probe packet reflecting the changed IP address (S37). In this case, the ARP probe packet may include an Opcode 1, a sender IP address 0.0.0.0, a sender MAC address 00:E0:4C:65:7E:35, a target IP address 169.254.x,y (changed IP address), and a target MAC address 00:00:00:00:00:00.

Thereafter, the theft terminal 1a waits to receive the reply packet to the ARP probe packet, and may confirm its IP address by transmitting the ARP announcement packet when the reply packet is not received. Since the IP address 169.254.x,y determined in this way may not access the network to which the normal terminal duplicated by the theft terminal 1a belongs, it is possible to block the theft terminal 1a from maliciously using the network. In addition, it is possible to protect the network use of the normal terminal.

The above-described embodiment may be implemented as computer-readable code on media in which a program is recorded. The computer-readable media includes all types of recording apparatus that store data that may be read by a computer system. An example of the computer readable medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disk, an optical data storage, and the like, and also include a medium implemented in a form of a carrier wave (for example, transmission through the Internet). In addition, the computer may include a control unit of a terminal. Therefore, the above-described detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure.

The invention claimed is:

1. A method for managing a terminal in a network system, comprising:
    analyzing packets received from a plurality of terminals connected to the network to collect and store address data of the plurality of terminals and status information indicating a network connection status of each of the plurality of terminals;
    receiving an address resolution protocol (ARP) probe packet;
    acquiring, from the ARP probe packet, a first internet protocol (IP) address and a first media access control (MAC) address of a first terminal that transmits the ARP probe packet;
    determining whether the first terminal is a theft terminal that duplicates address data of another terminal according to status information of a terminal that has the same address data as the first IP address and the first MAC address among the plurality of terminals, when address data including the same IP address and MAC address as the first IP address and the first MAC address is searched among pre-stored address data; and
    transmitting a reply packet to the ARP probe packet to the first terminal so that the IP address of the first terminal is reset to a second IP address by an automatic private IP addressing (APIPA) function of the first terminal, when the first terminal is determined to be the theft terminal.

2. The method for claim 1, wherein:
    the second IP address is an IP address from which access to the network is blocked.

3. The method for claim 1, further comprising:
    transmitting the reply packet to the ARP probe packet to the first terminal according to a preset preemptive IP protection/MAC static policy, when address data including the same IP address as the first IP address and a MAC address different from the first MAC address is searched among the address data.

4. The method for claim 1, further comprising:
    storing address data binding the first IP address and the first MAC address, when the address data including the same IP address and MAC address as the first IP address and the first MAC address is not searched among the address data.

5. The method for claim 1, further comprising:
    updating a MAC table of a switch using the pre-stored address data and simple network management protocol.

6. The method for claim 1, wherein:
    in a header of the ARP probe packet, an Opcode is 1, a sender MAC address is the first MAC address, a sender IP address is 0.0.0.0, a target MAC address is 00:00:00:00:00:00, and a target IP address is the first IP address.

7. The method for claim 1, wherein:
    in a header of the reply packet, an Opcode is 2, a sender MAC address is the first MAC address, a sender IP address is the first IP address, a target MAC address is the first MAC address, and a target IP address is the first IP address.

8. The method for claim 1, wherein:
    the collecting and storing includes:
    setting the status information of the second terminal to indicate an online status, when the IP packet or the ARP packet is received from the second terminal within the network.

9. The method for claim 8, wherein:
    the collecting and storing includes:
    transmitting an ARP request packet to the third terminal, when the IP packet or the ARP packet is not received from a third terminal among the plurality of terminals for a first time; and
    setting the status information of the third terminal to indicate an offline status, when a reply packet to the ARP request packet is not received for a second time.

10. The method for claim 9, wherein:
the determining includes
determining the first terminal as the theft terminal, when status information of a terminal corresponding to the first IP address and the first MAC address among the plurality of terminals indicates an online status.

11. An apparatus for managing a terminal, comprising:
a communication unit that communicates with a plurality of terminals connected to a network;
a storage unit that stores status information and address data indicating a network connection status for each of the plurality of terminals; and
a control unit that analyzes packets received from the plurality of terminals to collect the status information and the address data, acquires, from an ARP probe packet, a first IP address and a first MAC address of a first terminal that transmits the ARP probe packet when the ARP probe packet is received, determines whether the first terminal is a theft terminal that duplicates address data of another terminal according to status information of a terminal having the same address data as the first IP address and the first MAC address among the plurality of terminals when address data including the same IP address and MAC address as the first IP address and the first MAC address is searched among the address data stored in the storage unit, and transmits a reply packet to the ARP probe packet to the first terminal so that the IP address of the first terminal is reset to a second IP address by an APIPA function of the first terminal, when the first terminal is determined to be the theft terminal.

12. The apparatus of claim 11, wherein:
the second IP address is an IP address from which access to the network is blocked.

13. The apparatus of claim 11, wherein:
the control unit transmits the reply packet to the ARP probe packet to the first terminal according to a preset preemptive IP protection/MAC static policy, when address data including the same IP address as the first IP address and a MAC address different from the first MAC address is searched among the address data.

14. The apparatus of claim 11, wherein:
the control unit stores, in the storage unit, address data binding the first IP address and the first MAC address when the address data including the same IP address and MAC address as the first IP address and the first MAC address is not searched among the address data.

15. The apparatus of claim 11, wherein:
the control unit updates a MAC table of a switch using address data stored in the storage unit and simple network management protocol.

16. The apparatus of claim 11, wherein:
in a header of the ARP probe packet, an Opcode is 1, a sender MAC address is the first MAC address, a sender IP address is 0.0.0.0, a target MAC address is 00:00:00:00:00:00, and a target IP address is the first IP address.

17. The apparatus of claim 11, wherein:
in a header of the reply packet, an Opcode is 2, a sender MAC address is the first MAC address, a sender IP address is the first IP address, a target MAC address is the first MAC address, and a target IP address is the first IP address.

18. The apparatus of claim 11, wherein:
the control unit sets the status information of the second terminal to indicate an online status when the IP packet or the ARP packet is received from the second terminal within the network.

19. The apparatus of claim 18, wherein:
the control unit transmits an ARP request packet to the third terminal when the IP packet or the ARP packet is not received from a third terminal among the plurality of terminals for a first time, and sets the status information of the third terminal to indicate an offline status when the reply packet to the ARP request packet is not received for a second time.

20. The apparatus of claim 19, wherein:
the control unit determines the first terminal as the theft terminal when status information of a terminal corresponding to the first IP address and the first MAC address among the plurality of terminals indicates an online status.

* * * * *